Patented Sept. 13, 1949

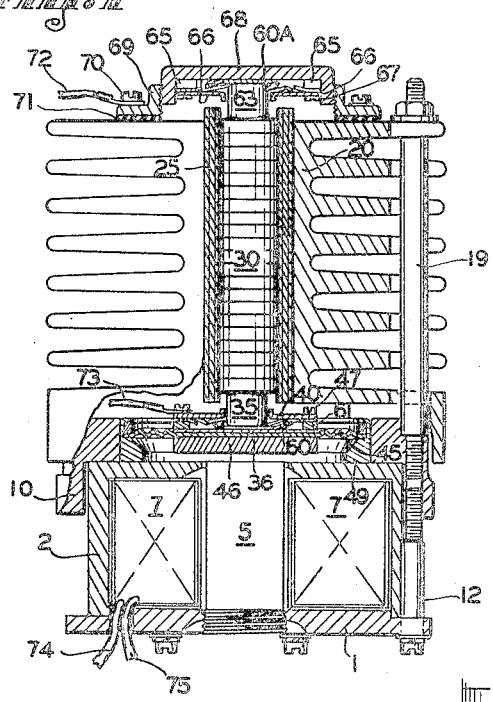

2,481,772

UNITED STATES PATENT OFFICE 2,481,772

CARBON PILE REGULATOR

William Greene Neild, Warren Point, N. J., assignor to Bendix Aviation Corporation, Teterboro, N. J., a corporation of Delaware Application November 6, 1945, Serial No. 627,028

8 Claims. (Cl. 201—51)

The present invention deals with electrical regulators and is concerned primarily with a regulator of the so-called "carbon pile type."

In the conventional type of carbon pile regulator, there is provided a pile of carbon discs having one end thereof fixedly supported by the regulator proper and the other end attached to a variably positioned armature operated by an electromagnet and a spring member tending to counteract the force of the electromagnet.

The spring member tends to urge the armature toward the carbon pile so as to compress the same, while the force of the electromagnet tends to withdraw the armature from the pile. The spring is of a type in which the force exerted by the spring varies approximately inversely as the square of the distance between the armature and the magnet so as to effect basic correspondence with changes in the magnetic force.

Such a conventional type carbon pile regulator may be arranged to regulate the output voltage of a shunt generator, the pile being connected in series with the shunt field of the generator. If the load is suddenly dropped from the generator, the terminal voltage will tend to rise so that the armature of the regulator will be attracted to the magnet decreasing the pile pressure and thereby adjusting its resistance to the proper value. However, in accomplishing this, the regulator armature due to its own inertia, will often overshoot removing all of the spring pressure from the carbon pile, which will in turn cause the compressed carbon pile discs to open. This results in a momentary open circuit in the generator field circuit which is highly inductive. The energy stored in the field of the generator will then dissipate itself in the form of a high voltage arc in the carbon pile. This momentary high voltage carbon arc will create a "localized hot spot" at the point at which it occurs burning away the high spots in the pile. After enough of the arcs have occurred, enough high spots will be burned away in the carbon pile to cause it to shorten and throw the regulator out of adjustment, thereby shortening the useful life of the regulator.

The life of the carbon pile would be lengthened, if these arcs could be prevented from occurring in the first instance and it is therefore an object of my invention to provide means for accomplishing the foregoing by providing novel additional spring members at either or both ends of the pile and arranged so that throughout the normal operating range of the regulator when the necessary forces on the carbon pile would be greater than the maximum force exerted by these additional spring members, the same would remain "bottomed" or ineffective. But just so soon as the armature tends to "overshoot," then these novel additional spring members will exert a pressure on the pile of a sufficient value to prevent the compressed pile discs from opening.

Another object of the invention is to so arrange the additional spring members as to apply a spring force of a sufficiently low value that even with the armature "bottomed" the maximum pile resistance would be only slightly higher than the maximum regulated resistance value.

Another object of the invention is to provide a novel spring structure for effecting the latter operation in which there is provided a flat surface at all times in an operative relation with the carbon pile contactor members so as to effect more accurate operation thereof.

These and other objects and advantages of the present invention will appear more fully hereinafter from a consideration of the detailed description which follows, taken together with the accompanying drawings wherein the features of the present invention are illustrated. It is to be expressly understood, however, that the drawings are for the purpose of illustration only and are not designed as a definition of the limits of the invention.

In the drawings wherein like reference characters refer to like parts throughout the several views:

Figure 1 is a vertical sectional view of a carbon pile regulator embodying one form of the invention.

Figure 2 is an enlarged top plan view showing the detail structure of the novel spring member.

Figure 3 is a fragmentary sectional view of the armature assembly showing the novel flat spring member in the bottomed position occupied during normal operation of the regulator.

Figure 4 is a fragmentary sectional view of the armature assembly showing the position that the novel flat spring assumes when the armature overshoots.

Referring to the drawing of Figure 1, there is provided a bottom plate 1 on which is mounted a casing 2. The bottom plate 1 and casing 2 are formed of a suitable ferro-magnetic material. A core 5 of similar material projects from the bottom plate 1 into an electromagnetic winding 7 wound about the core 5 and positioned within the casing 2.

Positioned on the casing 2 is an annular member 10 which is fastened to the bottom plate 1 by suitable screws 12, one of which is shown in the drawing.

A housing 20 of a type such as shown in my copending application Serial No. 570,002, filed December 27, 1944, now Patent No. 2,427,805, dated September 23, 1947, is fastened to the annular member 10 by studs 19.

Mounted within the housing 20, as shown in greater detail in the aforenoted application, is a non-conducting tube 25 formed of a suitable electric insulating material, such as porcelain. The tubular member 25 carries carbon discs 30 forming a carbon pile. A contactor member 35 is positioned between one end of the carbon pile 30 and an armature plate 36. The contactor member 35 is positioned in a retaining member 40 mounted on the armature plate 36 as will appear hereinafter.

The armature plate 36, as shown in Figure 1, is positioned at one side of a diaphragm 45 of a type such as shown in my copending application No. 612,691 filed August 25, 1945. At the opposite side of the diaphragm 45 is positioned a second armature plate 46 and the diaphragm 45 is clamped between the armature plates 36 and 46 by suitable fastening screws 47.

As shown in Figures 3 and 4, the diaphragm 45 is positioned in an annular member 49 having a seat portion 50. Annular edge portion 51 of the diaphragm 45 rests on the seat 50 and is clamped between the seat 50 and a second ring 52 which is held in position by rolling an edge portion 53 of the ring 49 over as shown. The member 49 is positioned within the annular member 10 as shown in Figures 1, 3 and 4.

The diaphragm 45 is formed of a circular shape, as shown in the copending application Serial No. 612,691 and of a suitable spring metal. Provided in the diaphragm 45 are suitable annular corrugations 54 of a proper depth to provide the desired spring characteristic to match the varying pull of the electromagnet 7 as the distance between the armature 46 and coil 5 changes.

Axial movement of the armature 46 is accommodated by the annular corrugations 53 formed in the diaphragm 45. It has been found that by providing the diaphragm 45 of a suitable material and thickness, and the corrugations 53 of a proper depth basic correspondence with the varying magnet pull results, due to changes in the distance across the air gap, may be effected as described in my aforenoted application.

Positioned between the contactor 35 and the top plate 36 of the armature, there is provided a flat spring 60 shown in greater detail in Figure 2. A portion of the flat spring 60 is clamped between an annular ring 61 and the retaining member 40, which are fastened to the armature assembly by the screws 47.

At the opposite end of the carbon pile 30, there is provided a contacting member 63. A free end of the contactor 63 is engaged by a flat spring 60a of a like type to the spring 60 shown in Figure 2. The spring 60a is clamped between an annular ring 65 and a retaining member 66 by bolts 67 which secure the same to the underside of a cap 68. The contactor 63 is positioned in the retaining member 66 as shown in Figure 1. The cap 68, moreover, is screw threadedly engaged in a cup shaped member 69 fastened to the housing 20 by suitable screws 70. The screws and member 69 are suitably electrically insulated from the housing 20 by an insulation member 71.

An electrical conductor 72 is connected to the upper end of the carbon pile 30 through the member 69, cap 68, spring 60a and contactor 63. A second electrical conductor member 73 is connected to the opposite end of the carbon pile 30, by members 40, 61, spring 60 and contactor 35. Suitable electrical conductors 74 and 75 lead to the electromagnet 7.

The novel flat springs 60 and 60a assure that at least a minimum compressive force will be applied at all times to the carbon pile 30 so as to prevent the carbon discs from opening upon the armature "overshooting" as previously described, and removing the compressive force of the spring diaphragm 54.

The flat springs 60 and 60a are formed in a disc shape of a suitable spring metal. There is provided a portion indicated in Figure 2 between the dotted line and the outer edge of the disc by the numeral 75 which is adapted to be clamped between the ring 61 and the member 40 or the ring 65 and the member 66.

Extending from the portion 75 are a plurality of arcuate shaped arms 76 which are cut from the spring metal disc 60. The arms 76 are flexibly connected at their outer ends to the portion 75 and at their inner ends to a portion 77 so as to floatingly support the portion 77 in relation to the portion 75. The arms 76 are so arranged as to permit axial movement of the portion 77 in relation to the outer portion 75 and further exert a relatively light spring force tending to return the portion 77 to a neutral position. Moreover, due to the resilience of the arcuate arms 76 the portion 77 does not bend under a superior force but rather the latter force is taken up by the resilient arcuate arms 76. Thus there is provided a novel flat spring having a flat surface, the portion 77 at all times in an operative relation to the contactors 35 or 63 and applying a light even spring force to the flat end surface of the contactors. This light spring force prevents the compressed carbon discs 30 from opening upon the armature 46 "overshooting."

In the operation of the device just described it will be seen moreover that during normal operation, the flat springs 60 and 60a will be "bottomed" as shown in Figures 1 and 3 so that the electromagnet 7 and the counteracting force of the diaphragm type spring 45 may serve to adjustably position the contactor 35 for varying the resistance of the carbon pile 30 in accordance with the energization of the electromagnet 7.

However, upon the armature 46 tending to overshoot, the light flat spring members 60 and 60a will at all times exert a force on the contactors 35 and 63 tending to apply a minimum pressure on the carbon pile so that the carbon discs may not open. Thus the light flat springs 60 and 60a exert a minimum spring force to prevent arcing between the carbon discs due to such overshooting. Thus the life of the carbon pile will be greatly increased and the burning of portions of the carbon pile due to arcing will be prevented.

Although only one embodiment of the invention has been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. In an electric regulator of the type including a plurality of compressible carbon discs forming a carbon pile, an armature operably connected so as to adjustably compress said carbon pile, a main spring member for biasing said armature in a first direction, and an electromagnet for biasing said armature in an opposite direction in opposition to said main spring member; the improvement comprising an auxiliary spring member positioned between said armature and one end of said carbon pile for applying a minimum compressive force to said carbon discs so as to prevent said carbon pile from opening upon said armature being biased to a position out of compressive relation with said carbon pile.

2. In an electric regulator of the type including a plurality of compressible carbon discs forming a carbon pile, an armature operably connected so as to adjustably compress said carbon pile, a main spring member for biasing said armature in a first direction, and an electromagnet for biasing said armature in an opposite direction in opposition to said main spring member; the improvement comprising a first auxiliary spring member positioned between said armature and one end of said carbon pile, a second auxiliary spring member positioned at the opposite end of said carbon pile, said first and second spring members acting in opposite directions so as to maintain the discs of said carbon pile compresed upon said armature being biased out of compressive relation with said carbon pile.

3. In an electric regulator of the type including a plurality of compressible carbon discs forming a carbon pile, an armature operably connected so as to adjustably compress said carbon pile, a main spring member for biasing said armature in a first direction and an electromagnet for biasing said armature in an opposite direction in opposition to said main spring member; the improvement comprising a flat disc spring positioned between said armature and one end of said carbon pile for applying a minimum compressive force to the discs of said carbon pile so as to prevent said carbon pile from opening upon the removal of the compressive force applied through said armature by said main spring member.

4. In an electric regulator of the type including a plurality of compressible carbon discs forming a carbon pile, an armature operably connected so as to adjustably compress said carbon pile, a main spring member for biasing said armature in a first direction and an electromagnet for biasing said armature in an opposite direction in opposition to said main spring member; the improvement comprising a flat disc spring positioned at one end of said carbon pile for applying a minimum compressive force to the discs of said carbon pile, said disc spring including a first portion fixedly mounted on said armature, a second portion centrally located relative to said first portion and operably connected to the one end of said carbon pile, a plurality of arcuate arms connecting said second portion to said first portion and permitting axial movement of the second portion relative to the first portion, said arcuate arms resiliently supporting the one end of said carbon pile so as to prevent said carbon pile from opening upon the removal of the compressive force applied through said armature.

5. In an electric regulator of the type including a plurality of compressible carbon discs forming a carbon pile, an armature operably connected so as to adjustably compress said carbon pile, a main spring member for biasing said armature in a first direction and an electromagnet for biasing said armature in an opposite direction in opposition to said main spring member; the improvement comprising a flat disc spring positioned at one end of said carbon pile for applying a minimum compressive force to the discs of said carbon pile, said disc spring including a first portion, supporting means for the first portion of said disc spring, a second portion centrally located relative to said first portion and operably connected to the one end of said carbon pile, a plurality of arcuate arms connecting said second portion to said first portion and permitting axial movement of the second portion relative to the first portion, said arcuate arms resiliently supporting the one end of said carbon pile so as to prevent said carbon pile from opening upon the removal of the compressive force applied through said armature.

6. In an electric regulator of the type including a plurality of compressive carbon discs forming a carbon pile, a housing for said carbon pile, an armature operably connected so as to adjustably compress said carbon pile, a main spring member for biasing said armature in a direction for compressing said pile of carbon discs, and an electromagnet for biasing said armature in an opposite direction in opposition to the compressive force of said main spring member; the improvement comprising a first disc spring carried by said housing and positioned at one end of said pile of carbon discs, a second disc spring carried by said armature and positioned between said armature and the opposite end of said pile of carbon discs, said first and second disc springs maintaining said pile of carbon discs under a minimum compressive force upon said armature being biased under force of said electromagnet so as to remove the compressive force of said main spring.

7. In an electric regulator of the type including a plurality of compressible carbon discs forming a carbon pile, a housing for said carbon pile, an armature operably connected so as to adjustably compress said carbon pile, a main spring member for biasing said armature in a direction for compressing said pile of carbon discs, and an electromagnet for biasing said armature in an opposite direction in opposition to the compressive force of said main spring member; the improvement comprising a first disc spring carried by said housing and positioned at one end of said pile of carbon discs, a second disc spring carried by said armature and positioned between said armature and the opposite end of said pile of carbon discs, said first and second disc springs maintaining said pile of carbon discs under a minimum compressive force upon said armature being biased under force of said electromagnet so as to remove the compressive force of said main spring, and means for limiting the movement of said disc springs under the compressive force of said main spring so that said armature under the opposing forces of said main spring and electromagnet may control the compression of said carbon pile during normal operation.

8. For use in an electric regulator having a plurality of compressible carbon discs forming a carbon pile, and means for adjusting the compression of said pile; means for maintaining a minimum compressive force on the pile of carbon discs under all operating conditions of the regulator, said last mentioned means comprising a flat disc spring to be positioned at one end of said carbon pile for applying a minimum compressive force to the discs of said carbon pile, said disc spring including a first outer portion, a second inner portion centrally located relative to said first portion and arranged for operable connection to the one end of said carbon pile, a plurality of arcuate arms connecting said second inner portion to said first outer portion and permitting axial movement of the second portion relative to the first portion, said arcuate arms for resiliently supporting the one end of said carbon pile so as to prevent said carbon pile from opening upon removal of compressive force applied through said adjusting means.

WILLIAM GREENE NEILD.

REFERENCES CITED

The following references are of record in the file of this patent:

UNITED STATES PATENTS

| Number | Name | Date |
| --- | --- | --- |
| 1,162,174 | Krauss | Nov. 30, 1915 |
| 1,319,855 | Donop | Oct. 28, 1919 |
| 1,681,314 | Vawter | Aug. 21, 1928 |
| 1,872,068 | Brown | Aug. 16, 1932 |
| 1,883,249 | Spencer | Oct. 18, 1932 |
| 1,988,641 | Wilms | Jan. 22, 1935 |
| 2,169,787 | Becker | Aug. 15, 1939 |
| 2,393,951 | Austin | Feb. 5, 1946 |